Patented Sept. 5, 1939

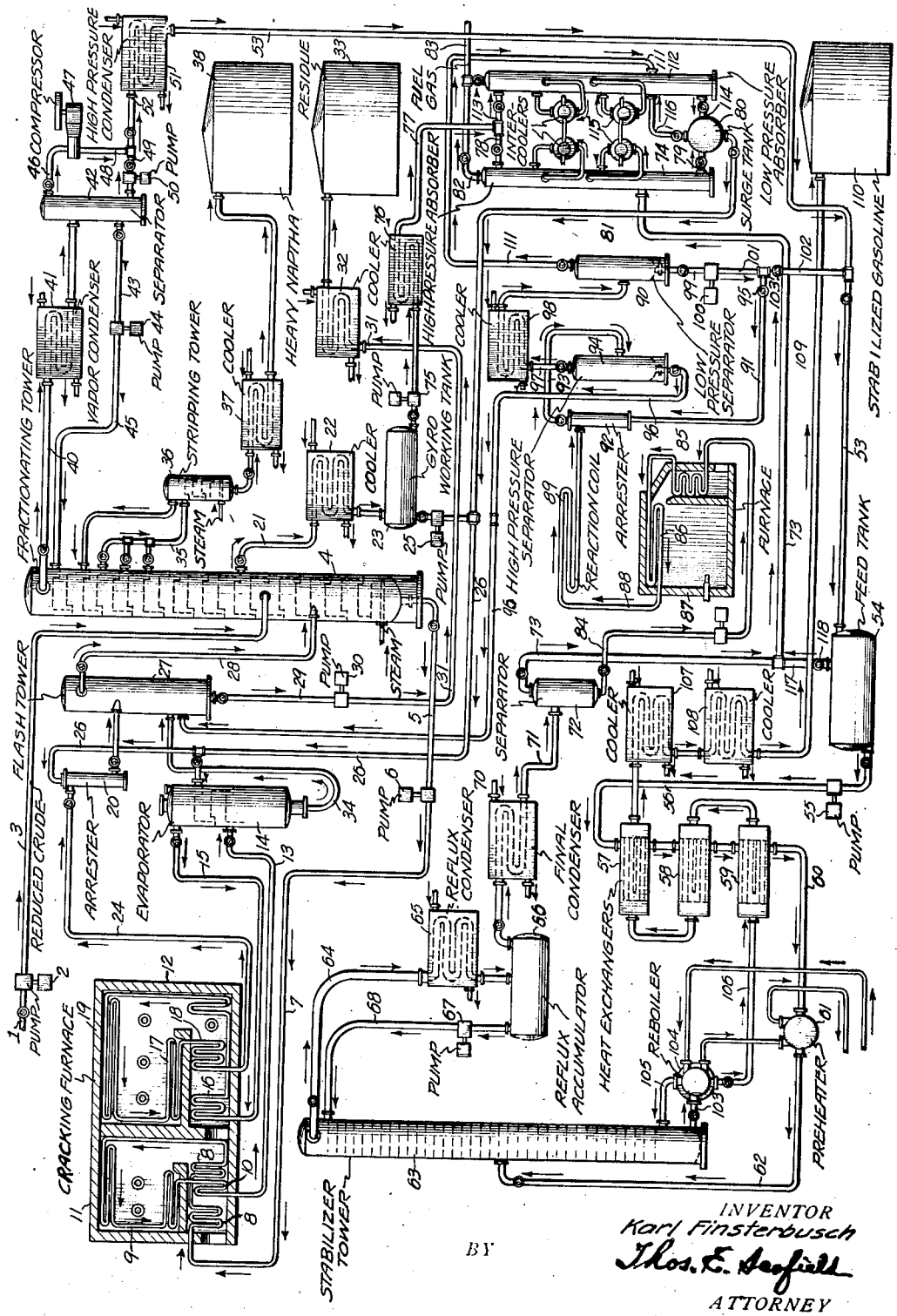

2,171,522

UNITED STATES PATENT OFFICE 2,171,522

METHOD OF CONVERTING HYDROCARBONS

Karl Finsterbusch, New York, N. Y., assignor, by mesne assignments, to The Pure Oil Company, Chicago, Ill., a corporation of Ohio Application October 13, 1933, Serial No. 693,463

20 Claims. (Cl. 196—10)

My invention relates to a method of converting hydrocarbons and more particularly to a method of producing a blended stabilized motor fuel comprising both cracked distillate, that is, distillate obtained by converting hydrocarbons of higher molecular weight into lower molecular weight, and polymerized distillate, that is distillate obtained by converting hydrocarbons of lower molecular weight into hydrocarbons of higher molecular weight.

In a vapor phase process such as disclosed in copending application to John Wycliffe Throckmorton, Serial No. 687,985, filed September 2, 1933, in which hydrocarbon oils are converted into hydrocarbons of lower molecular weight, a considerable volume of gaseous and low boiling hydrocarbons is formed. The formation of light hydrocarbons is more or less inherent to a vapor phase process of this type. The application of John Wycliffe Throckmorton, above referred to, is an improved form of what is known to the art as the "Gyro Process". In actual practice, refiners who make motor fuel by converting the hydrocarbon oil using the Gyro Process employ a polymerization unit in conjunction with the Gyro cracking unit in order to recover a polymerized distillate. This polymerized distillate not only represents a distinct advantage in increasing yields by the conversion of light hydrocarbons which could not be used as motor fuel, but the polymerized distillate has an extremely high octane number or antiknock value.

One object of my invention is to provide a combined cracking and polymerization process which will produce a blended stabilized motor fuel containing both cracked distillate and polymerized distillate.

Another object of my invention is to provide a polymerizing process for use in conjunction with a cracking process in which the size of the polymerization unit is reduced by eliminating from the polymerization feed undesirable lighter constituents.

Another object of my invention is to provide a polymerization process of the character described, in which the yield of polymerized distillate is relatively increased by obtaining a greater degree of conversion of the unsaturated hydrocarbons present in the feed by virtue of two factors, viz., (a) the unsaturates in the feed are present in greater percentage, due to the elimination of undesirable constituents from the feed, thus giving a more ideal charging stock and permitting regulation of operation to attain optimum conditions for maximum conversion; (b) the recycle will also primarily consist of the desired unsaturate components because of substantial elimination of the products of reaction which are not desirable. The elimination of undesirable constituents from the feed greatly facilitates the subsequent processing of reaction products since they are not contaminated by a large proportion of these undesirable fractions.

Another object of my invention is to reduce the size of the polymerization unit for a given quantity of gases from a cracking operation.

Another object of my invention is to provide a polymerization unit feed in liquid state in order to reduce the compression horsepower that would be required to deliver the feed at polymerization pressures if it were in vapor or gaseous state in which it leaves the cracking unit.

Other and further objects of my invention will appear from the following description.

The accompanying drawing represents a diagrammatic view of one form of apparatus capable of carrying out the process of my invention.

In former polymerization systems, all the Gyro gas was taken from the separator and compressed to 600 lbs. or 800 lbs. in order to be fed to the polymerization unit. In my system, I compress the gas to 450 lbs. which considerably reduces the first cost of compressors and materially decreases their cost of operation.

In general, my invention contemplates combining both the cracked Gyro distillate and the recovered light gasoline from the Gyro gas or any other gases, vapors, or liquids containing polymerizable constituents and introducing this stream into a fractionating tower. The stream generally will include a relatively high percentage of propylene and butylene. The fractionating unit into which this stream is introduced is designed to produce as a bottom product all of the fractions containing five carbon atoms per molecule, and the heavier fractions, together with a certain amount of fractions containing 4 carbon atoms per molecule in order to enable the motor fuel to meet proper vapor pressure specifications and to provide a certain quantity of light ends. The remainder of the fractions containing 4 carbon atoms per molecule, all of the fractions containing 3 carbon atoms per molecule, and those lighter and including hydrogen, are taken overhead and condensed and passed to a separator accumulator from which the uncondensed light fractions pass to a high pressure absorber where any desirable heavier fractions such as propylene and butylene are recovered and ultimately recycled. The liquid from the separator, composed mainly of propylene and butylene, with some propane and lesser amounts of butane, ethylene, ethane and methane, comprises the stream which is fed to the polymerization unit, or the polymerization feed. This stream is heated to polymerization temperatures and maintained under polymerization pressures and then passed through a reaction coil to give the time interval required for exothermic polymerization reaction. In order to prevent the polymerization reaction from proceeding too far with the result that undesirable heavier polymers and gums are formed, a quench oil previously removed from the low pressure separator is introduced into contact with the stream from the reaction coil in an arrester from which the products pass into a high pressure separator.

The bottom product in the high pressure separator will contain the heavy ends and most of the gums and is withdrawn from the high pressure separator and passed to a suitable point in the cracking unit for recycling. The elimination of gums at this point will give a much more satisfactory operation in the condenser and apparatus used in the subsequent handling of the raw polymerized distillate. Vapors from the high pressure separator are then cooled and passed to a low pressure separator. Although the pressure on this unit could be maintained almost equal to pressure on the high pressure separator, this is generally not desirable as considerable amounts of light fractions would be condensed. In most cases, therefore, the pressure will be reduced to a point at which most of the propylene and heavier fractions are condensed and a large portion of the lighter fractions will remain as vapors. The relatively small quantity of desirable fractions, such as propylene, butylene and those fractions, containing five or more carbon atoms per molecule which pass off with the vapors, may be recovered in a low pressure absorber. The polymerized distillate and large proportion of unpolymerized propylene and butylene, which has thus been liquefied, may then be passed to a separate fractionating tower for recovery of the high anti-knock polymerized distillate as a separate product or, as in the case outlined herein, passed to the fractionating tower which, in order to avoid confusing with the fractionating tower of the cracking unit, I shall hereinafter refer to as the stabilizer tower. The liquid from the low pressure separator, which we shall refer to as raw polymerized distillate, is fractionated in the stabilizer where the desirable polymerized products will be removed as a bottom product along with constituents similarly separated from the Gyro distillate, as described above. The unpolymerized butylene and lighter constituents, including propylene, are taken as overhead from the stabilizer as previously described and thus become recycle stock for the polymerization unit.

This may clearly be seen from the above, and previous description of stabilizer tower operation, since the butylene and lighter fractions taken overhead from the Gyro distillate and recovered light gasoline from the Gyro gas may be considered as fresh feed for the polymerization unit and those butylene and lighter constituents, taken overhead from the raw polymerized distillate, may be considered as recycle feed.

The overhead vapors and gases from the high pressure absorber will contain the undesirable gases which I do not pass through my polymerization unit, such as ethane, ethylene, methane and hydrogen. In so rejecting the lighter gases, I am enabled to reduce the size of the polymerization unit. The gases and vapors from the low pressure separator are passed to a low pressure absorber where the relatively small quantity of desirable fractions such as propylene, butylene and C₅+ fractions are recovered and returned finally to the stabilizing tower. The undesirable lighter gases are rejected from the low pressure lighter gases. These comprise those hydrocarbon gases containing 1 or 2 carbon atoms per molecule, and hydrogen. Thus, I am enabled to further reduce the size of the polymerization unit by rejecting these lighter gases from the recycle. It will also be seen that the rejection of lighter constituents from both the fresh feed and recycle will leave the desirable polymerizable constituents in the total feed to the polymerization unit in a higher degree of purity than would otherwise be obtained. A portion of a side stream taken from the fractionating tower of the cracking unit is used as the scrubbing menstruum in both absorbers. The enriched oil containing the absorbed desirable fractions, is pumped along with the remainder of the side stream into the arrester of the Gyro unit where the desirable constituents are ultimately recovered without the necessity of using a separate distillation unit for the enriched oil. It will be understood, of course, that a separate rich oil distillation unit may be used if desired.

More particularly referring now to the drawing, a reduced crude from a topping operation, or any other suitable source, is introduced to line 1, from which it is pumped by pump 2 through line 3 and discharged into a fractionating tower 4, withdrawn from the bottom of the tower through line 5 and pumped by means of pump 6 through line 7, through convection bank 8, through radiant heat bank 9, through convection bank 10 of the low temperature or viscosity breaking section 11 of cracking furnace 12. The oil thus heated passes through line 13 into an evaporator tower 14, from which the vapors are taken overhead through line 15 and passed through convection bank 16, the radiant heat bank 17 and convection or soaking bank 18 of the high temperature section 19 of the cracking furnace 12. The vapors subjected to pyrolytic conversion in the high temperature section 19 pass from soaking coil 18 through line 24 into reaction arrester 20 in which the reaction is stopped by intimately admixing a quantity of a side stream withdrawn from the fractionating tower 4 through line 21. The side stream withdrawn through line 21 is passed through cooler 22 into working tank 23 from which it is pumped by pump 25 through line 26 which passes to the arrester. The quenched products pass into a flash tower 27 which is maintained at a pressure lower than that which exists in the evaporator 14. The vapors are taken from the flash tower overhead and pass through line 28, into the fractionating tower 4.

The residue from the flash tower is removed through line 29 and pumped by pump 30 through line 31, through cooler 32 to a residue storage tank 33. The unvaporized oil is removed from the evaporator 14 through line 34 and introduced into the flash tower 27. Suitable side streams may be removed from the fractionating tower through line 35 and stripped in stripper 36, cooled in cooler 37, and stored in naphtha storage tank 38. If desired the entire cracked distillate may be taken overhead. The uncondensed vapors and gases are taken overhead from the fractionating tower through line 40, cooled in condenser 41 and passed to separator 42, from which a reflux condensate is withdrawn through line 43 and pumped by pump 44 into the tower through line 45. The uncondensed vapors and gases are taken from the separator through line 46 and compressed by compressor 47, passed through line 48, where they are joined by the Gyro distillate removed from the separator, through line 49 by pump 50. The combined compressed gases, vapors and condensed distillate pass to cooler 51 through line 52. The combined stream is passed through line 53 to feed tank 54, from which liquid pumped by pump 55 through line 56, through heat exchangers 57, 58, and 59, through line 60, through preheater 61, through line 62, into the stabilizer tower 63. The liquid feed to the stabilizer tower will contain the cracked Gyro distillate and a high proportion of light gasoline that was originally contained in the Gyro gas. This light gasoline was recovered through compression and condensation. This liquid feed will include a relatively high percentage of propylene and butylene. The stabilizing unit is so designed to produce a bottom product containing all of the $C_{5+}$ fractions with the required amount of $C_4$ fractions to meet proper vapor pressure specifications. The $C_3$ and lighter fractions in the feed are taken overhead with the balance of the $C_4$ fractions not held in the bottom product, through line 64, through reflux condenser 65 to reflux accumulator tank 66, from which a reflux is pumped by pump 67 through line 68 to tower 63.

The overhead passes through final condenser 70, through line 71, to a separator accumulator 72, from which the uncondensed light fractions are taken overhead through line 73 and passed to a high pressure absorber 74 where any desirable heavier fractions such as propylene and butylene are recovered in the absorbing menstruum. At this point it is well to observe that the side stream taken from fractionating tower 4 and collected in working tank 23 is employed as the absorbing menstruum.

Pump 75 pumps the oil from the working tank 23 through cooler 76 through line 77, through line 78, into high pressure absorber 74. The enriched oil from the absorber passes through line 79 into surge tank 80, from which it passes through line 81 to line 26 so that it may join oil coming to the arrester, thus eliminating the necessity of a distillation unit for the enriched absorption menstruum. The desirable fractions will be recovered in fractionating tower 4 and ultimately incorporated in the stream passing through line 53. It will be observed also that the lighter products which I eliminate from the polymerization feed, namely hydrogen, methane, ethylene and ethane, pass overhead from the high pressure absorber 74, through line 82 into fuel gas main 83. This step of thus substantially eliminating the undesirable light fractions from the polymerization feed reduces the size of the polymerization unit. By thus only partially condensing the overhead from the stabilizer tower any valuable constituents passing out with the gas are readily recovered in the high pressure absorber with the attendant rejection of most of the lighter undesirable gases. The liquid product in separator accumulator 72 forms the polymerization feed and is composed mainly of propylene and butylene with some propane and lesser amounts of butane, ethylene, ethane and methane. It is removed from the separator 72 through line 84 and is passed through heating coils 85 and 86 in polymerization furnace 87, through line 88, to reaction coil 89 in which the exothermic polymerization reaction time interval is supplied.

It should also be noted that by this process I have obtained the feed to the polymerization unit in liquid state although most of the polymerizable constituents, originally formed in the cracking operation and delivered from the cracking unit at separator 42, are in vapor or gaseous state and it would be necessary, if the lighter fractions were not separated and eliminated to compress the total gases to a pressure required for polymerization, whereas in the process outlined the compression is only carried to a pressure at which a substantial proportion of the desirable heavier constituents of the vapors are condensed which effects a considerable saving in compressors and expense of operation.

A portion of the polymerized distillate from low pressure separator 90 passes through line 91 and is continuously commingled with the polymerized products in an arrester 92 in order to stop polymerization reaction and thus prevent formation of heavy polymers and gums. The quenched products leave the arrester 92 through line 93 and pass to the high pressure separator 94. The temperature is so controlled in the arrester by means of valve 95 which controls the arresting feed that most of the heavy polymers and gums will collect in the bottom of high pressure separator 94, whence they are removed through line 96 and passed therethrough to the flash tower 27 of the cracking unit. Those polymers which vaporize will be recovered in the vapors passing from the flash evaporator through line 28, while the liquid and gum portions will be removed through line 29 and passed to residue tank 33. Most of the desirable polymerized distillate will be in the form of vapors and will leave pressure separator 94 through line 97 and pass through cooler 98 into low pressure separator 90 in which the desired polymerized distillate will collect as a liquid. Distillate passes from the bottom of low pressure separator 90 through line 99 and is pumped by pump 100 through line 101, valve 103', and line 102, to line 53, together with the cracked distillate to the feed tank 54, from which it passes to the stabilizer tower as pointed out above. In the stabilizer tower, the bottom fractions which, as pointed out above, contain the desired motor distillate, are withdrawn through line 103 and pass to reboiler 104 from which the vapors pass through line 105 back into the stabilizer tower, the desired motor fuel passing through line 106, through heat exchangers 59, 58, and 57, through cooler 107, through cooler 108, through line 109, to the stabilized gasoline storage tank 110. The gases from the low pressure separator 90 pass overhead through line 111 to the low pressure absorber 112, which is supplied with the same absorption menstruum as used in the high pressure absorber, through line 113, the enriched oil being withdrawn from the bottom of low pressure absorber 112, through line 114, from which it passes into surge tank 80 for passage through line 81 along with the enriched oil from the high pressure absorber. Inter-coolers 115 are provided in the high pressure and low pressure absorbers. The surge tank 80 is provided with a vent 116 which passes to the low pressure absorber. The feed tank 54 is provided with a vent 117 controlled by valve 118 so that gases may be vented from the feed tank to line 73 for passage to the high pressure absorber. It is believed that the operation of my process will be clear from the foregoing description.

It will be seen that I have accomplished the objects of my invention. I am enabled to produce a blended stabilized motor fuel containing both cracked distillate and polymerized distillate, and also light gasoline recovered from cracked gases, and a motor fuel, furthermore, of extremely high anti-knock value.

By eliminating the undesirable lighter constituents from the polymerization feed, I am enabled to reduce the size of the polymerization unit. By elimination of the undesirable lighter constituents from the polymerization feed, I have increased the proportions of the desired polymerizable constituents in the feed, thus permitting better control of operation to obtain optimum conditions for maximum conversion of these constituents to polymerized distillate, thus obtaining a relatively greater yield. Greater concentration of polymerizable constituents results in a more rapid and more complete reaction. By elimination of the undesirable lighter constituents, I am enabled to obtain the polymerization feed in liquid state and thus bring it to polymerization pressure by means of a pump, whereas if the polymerizable constituents were contaminated by the undesirable lighter constituents, practically all would be in vapor or gaseous state and would have to be brought to polymerization pressure by means of compressors.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a polymerization process in which a stream of cracked hydrocarbon distillate and hydrocarbon gases is subjected to cooling under pressure to liquefy the gases and then rectified to obtain a polymerization feed, the steps of separating, in the rectification step, the hydrocarbons into two classes, namely, Class V, comprising a portion of those hydrocarbons having the formula $C_4H_{10}$ and $C_4H_8$ and all lighter hydrocarbons, and Class L, comprising the remainder of those hydrocarbons having the formula $C_4H_8$ and $C_4H_{10}$, and all heavier hydrocarbons, separately withdrawing hydrocarbons of Class L and Class V, from the rectification step, condensing the hydrocarbons of Class V so that the majority of hydrocarbons of the formula $C_3H_8$, $C_3H_6$, $C_4H_8$, $C_4H_{10}$ will be in the liquid phase and the majority of hydrocarbons of the formula $C_2H_4$, $C_2H_6$, and $CH_4$ will be in the gas phase, separately withdrawing the liquid and gaseous hydrocarbons, polymerizing the liquid hydrocarbons under heat and pressure, and introducing polymerized products into the rectification step.

2. The method of converting hydrocarbon oils into hydrocarbons of the nature of motor fuel comprising the steps of cracking hydrocarbon vapors, fractionating the cracked vapors, removing the vapors and gases from the fractionating step, liquefying the vapors and gases by subjecting them to cooling under pressure rectifying said liquefied vapors and gases, condensing overhead products from the rectification step, separating the gases from liquid condensates, subjecting the condensate to polymerization by heat and pressure, condensing the products withdrawn from the polymerizing step, separately withdrawing the gases and liquid polymers in a separating zone, passing a portion of the liquid polymers to the rectification step and withdrawing a stabilized motor fuel therefrom.

3. A process for producing a hydrocarbon motor fuel, including the steps of withdrawing from a cracking operation a stream comprising cracked hydrocarbon distillate and distillate recovered by compression and cooling of gases from the hydrocarbon cracking operation, eliminating a portion of the hydrocarbons having 4 carbon atoms per molecule and all heavier hydrocarbons from the stream in a rectification step, separately withdrawing overhead the remainder of the hydrocarbons having 4 carbon atoms per molecule and all lighter hydrocarbons from the rectification zone and approximately separating those hydrocarbons having 3 and 4 carbon atoms per molecule from those hydrocarbons having 1 and 2 carbon atoms per molecule by condensing the hydrocarbons withdrawn overhead from the rectification step so that the majority of the hydrocarbons having 3 and 4 carbon atoms per molecule are in the liquid phase and the majority of the hydrocarbons having 1 and 2 carbon atoms per molecule are in the gas phase, passing the liquid hydrocarbons to a polymerization zone and there polymerizing the same under heat and pressure, introducing a portion of the polymers into the rectification step and passing the hydrocarbons in the gas phase into contact with a hydrocarbon oil in an absorption step to recover hydrocarbons having 3 and 4 carbon atoms per molecule.

4. A process as in claim 3 wherein the absorption hydrocarbon oil is withdrawn from a point in the cracking operation and enriched oil from the absorption step is returned to the cracking operation.

5. A process as in claim 3 wherein the products of polymerization are contacted in a polymerization arresting step, with a cool hydrocarbon oil previously separated from the process, including the step of separating the heavy polymers condensed by the arresting operation from hydrocarbon polymers in the vapor phase, condensing the polymer vapors, separating the liquid polymers from the uncondensed hydrocarbons and then performing said step of introducing a portion of the polymers into the rectification step.

6. A process as in claim 3 wherein the products of polymerization are contacted in a polymerization arresting step, with a cool hydrocarbon oil previously separated from the process, including the step of separating the heavy polymers condensed by the arresting operation from hydrocarbon polymers in the vapor phase, condensing the polymer vapors, separating the liquid polymers from the uncondensed hydrocarbons and then performing said step of introducing a portion of the polymers into the rectification step and utilizing a portion of the liquid polymers as the cool hydrocarbon oil in the arresting step.

7. A process as in claim 3 wherein the products of polymerization are contacted in a polymerization arresting step, with a cool hydrocarbon oil previously separated from the process, including the step of separating the heavy polymers and gums condensed by the arresting operation from hydrocarbon polymers in the vapor phase, condensing the polymer vapors, separating the liquid polymers from the uncondensed hydrocarbons and then performing said step of introducing a portion of the polymers into the rectification step, utilizing a portion of the liquid polymers as the cool hydrocarbon oil in the arresting step, and passing the uncondensed hydrocarbons into contact with a hydrocarbon oil in an absorption step.

8. A process as in claim 3 wherein the products of polymerization are contacted in a polymerization arresting step, with a cool hydrocarbon oil previously separated from the process, including the step of separating the heavy polymers and gums condensed by the arresting operation from hydrocarbon polymers in the vapor phase, condensing the polymer vapors, separating the liquid polymers from the uncondensed hydrocarbons and then performing said step of introducing a portion of the polymers into the rectification step, utilizing a portion of the liquid polymers as the cool hydrocarbon oil in the arresting step, and passing the uncondensed hydrocarbons into contact with a hydrocarbon oil in an absorption step, in which the absorption hydrocarbon oil is withdrawn from a point in the cracking operation and enriched oil is returned to the cracking operation.

9. A process as in claim 3 wherein the products of polymerization are contacted in a polymerization arresting step, with a cool hydrocarbon oil previously separated from the process, including the step of separating the heavy polymers and gums condensed by the arresting operation from hydrocarbon polymers in the vapor phase, condensing the polymer vapors, separating the liquid polymers from the uncondensed hydrocarbons, then performing said step of introducing a portion of the polymers into the rectification step and introducing the heavy polymers and gums into a point in the cracking operation.

10. A process of polymerizing light hydrocarbons including the steps of subjecting the hydrocarbons to pressures below that at which the polymerization reaction takes place, cooling the hydrocarbons to a predetermined temperature at which the desired polymerizable hydrocarbons condense while the undesirable light hydrocarbons including methane, ethane and ethylene remain in the gaseous or vapor phase, separating the gases from the liquid condensate, and charging the liquid condensate to the polymerizing furnace and there heating it and obtaining the increment of temperature to reach the desired polymerizing temperature autogenously.

11. A method of converting normally gaseous hydrocarbons into liquid hydrocarbons suitable for use as a motor fuel including the steps of compressing and cooling the gaseous hydrocarbons, to liquefy those gaseous hydrocarbons containing 3 or more carbon atoms per molecule, separating the liquid from the non-liquid fractions, heating the liquid fraction to polymerizing temperatures and maintaining polymerizing pressures during the reaction step, suddenly reducing the temperature of the reacting hydrocarbons by contacting the same with a cooling medium whereby the formation of undesirable heavy hydrocarbons is prevented and recovering the desired liquid hydrocarbons.

12. In a process for converting olefinic gases, containing hydrocarbons ranging from those with 1 carbon atom to those having 4 carbon atoms, to liquid hydrocarbons, the steps which comprise fractionating the gases under conditions of temperature and pressure suitable for separating said gases into a liquid portion consisting chiefly of hydrocarbons having 3 and 4 carbon atoms and a gaseous portion containing the major portion of the hydrogen, methane, ethylene and ethane present in the gases, and subjecting the said liquid portion alone to heat and pressure type polymerization at pressures of at least 600 pounds per square inch and at elevated temperatures suitable for polymerization of butylene and propylene to hydrocarbons of gasoline boiling range.

13. In the polymerization of hydrocarbon gases containing a substantial portion of olefins, the steps of compressing said gases to a pressure sufficient to liquefy $C_3$ and $C_4$ hydrocarbons at the prevailing temperature of the gas, fractionating the compressed gas to separate the $C_2$ and lighter gases from the $C_3$ and heavier gases, eliminating the $C_2$ and lighter gases from the system, polymerizing the fraction containing the $C_3$ and heavier gases under conditions of temperature and pressure suitable for converting a substantial part of said fraction to hydrocarbons boiling within the gasoline range, fractionating the resulting products in order to obtain a liquid fraction containing the major portion of the remaining $C_3$ and $C_4$ hydrocarbons, and a gas fraction containing substantially all of the $C_2$ and lighter gases, and uniting the last mentioned liquid fraction with the first mentioned compressed gases prior to fractionation thereof.

14. A process for producing a hydrocarbon motor fuel, including the steps of compressing gases from an oil cracking operation, fractionating said gases into a heavy liquid fraction and a light gaseous fraction, subjecting the liquid fraction to polymerization in a separate operation under conditions of temperature and pressure suitable for converting a substantial portion thereof to hydrocarbons boiling within the gasoline range, separating the reaction products into a heavy fraction containing those constituents boiling above the gasoline range, an intermediate fraction containing the major portion of the hydrocarbon boiling within the gasoline range, and a light gaseous fraction, and recycling said last mentioned heavy fraction to said oil cracking operation.

15. A process for producing a hydrocarbon motor fuel including the steps of cracking oil, fractionating the cracked products in a fractionating zone, separating incondensible gases from the cracked products, separating said gases into a heavy liquid fraction and a light gas fraction, subjecting the liquid fraction to polymerization in a separate zone under conditions of temperature and pressure suitable for converting a substantial portion thereof into hydrocarbons boiling within the gasoline range, separating the polymerization products into liquids and gases, contacting said gases under pressure in an absorption zone with a condensate heavier than gasoline separated in said fractionating zone, contacting the enriched condensate with hot reaction products issuing from the cracking step, and eliminating the unabsorbed gas from the system.

16. Process in accordance with claim 15 including the steps of fractionating the polymerization products to separate a liquid fraction containing those constitutents boiling above the gasoline range and recycling the fraction to the oil cracking operation.

17. In a process for producing hydrocarbon motor fuel the steps of subjecting the gasoline distillate and the wet gases from an oil cracking operation to sufficient pressure to liquefy $C_3$ and higher hydrocarbons, rectifying the resulting liquid to separate stabilized gasoline from the normally gaseous constituents, separating the normally gaseous constituents into a heavy liquid fraction and a light gaseous fraction, subjecting said heavy liquid fraction to polymerization in a separate zone under conditions of temperature and pressure suitable for converting a substantial portion thereof to hydrocarbons boiling within the gasoline range, fractionating the polymerization products in order to obtain a gasoline distillate containing the major portion of the $C_3$ and $C_4$ hydrocarbons, and rectifying said distillate together with said resulting liquid.

18. Process in accordance with claim 17 including the steps of recovering $C_3$ and $C_4$ hydrocarbons from the residual gas of the polymerization reaction by absorbing them in heavy condensate from the cracking operation, and recycling the rich condensate to the cracking operation to separate the $C_3$, $C_4$ hydrocarbons from the condensate.

19. Process in accordance with claim 17 including the steps of recovering $C_3$ and $C_4$ hydrocarbons from said light gaseous fraction and from the residual gases of the polymerization reaction by absorbing them in heavy condensate from the cracking operation, and recycling the rich condensate to the cracking operation to separate the $C_3$, $C_4$ hydrocarbons from the condensate.

20. Process in accordance with claim 17 including the steps of fractionating the polymerization products to obtain a fraction containing those constituents boiling above the gasoline range and recycling the fraction to the cracking operation.

KARL FINSTERBUSCH.